United States Patent [19]
Fan

[11] Patent Number: 6,131,334
[45] Date of Patent: *Oct. 17, 2000

[54] SELF-WATERING TRAY

[76] Inventor: Jianhua Fan, 5800 Maudina Ave., #C2, Nashville, Tenn. 37209

[ * ] Notice: This patent is subject to a terminal disclaimer.

[21] Appl. No.: 09/208,121

[22] Filed: Dec. 9, 1998

Related U.S. Application Data

[63] Continuation-in-part of application No. 09/119,176, Jul. 20, 1998.

[51] Int. Cl.⁷ .................................................. A01G 27/04
[52] U.S. Cl. .................................................... 47/81
[58] Field of Search .................................. 47/79, 80, 81, 47/75, 31

[56] References Cited

U.S. PATENT DOCUMENTS

| | | |
|---|---|---|
| D. 250,401 | 11/1978 | O'Shea et al. |
| D. 313,203 | 12/1990 | Carlson . |

(List continued on next page.)

FOREIGN PATENT DOCUMENTS

| | | | |
|---|---|---|---|
| 0 769 243 A1 | 4/1997 | European Pat. Off. | |
| 579120 | 10/1924 | France . | |
| 1024483 | 4/1953 | France . | |
| 1263364 | 12/1961 | France . | |
| 649568 | 10/1964 | France . | |
| 1554194 | 10/1968 | France | 47/81 |
| 2 310 695 | 12/1976 | France . | |
| 2 724 813 A1 | 3/1996 | France . | |
| 24 33 734 | 1/1976 | Germany . | |
| 2539552 | 3/1977 | Germany | 47/81 |
| 3131 282 A1 | 2/1983 | Germany . | |
| 35 10513 A1 | 9/1986 | Germany . | |
| 6-141683 | 5/1994 | Japan | 47/81 |
| 8 800273 | 9/1989 | Netherlands . | |
| 308827 | 10/1955 | Switzerland . | |
| 4743 | 1/1894 | United Kingdom . | |
| 22647 | 8/1913 | United Kingdom . | |
| 1 200 604 | 9/1965 | United Kingdom | 47/80 |
| 112153 | 5/1968 | United Kingdom . | |
| 1192431 | 5/1970 | United Kingdom . | |
| 1 316 159 | 5/1973 | United Kingdom . | |
| 2 240 250 | 7/1991 | United Kingdom . | |
| WO 96/35326 | 11/1996 | WIPO . | |

OTHER PUBLICATIONS

12 Photos of products sold on the market by Misco, found on the market Jan. 1998.

11 Photos of products sold on the market by Bemis, found on the market Jul. 1998.

Primary Examiner—Michael J. Carone
Assistant Examiner—Jeffrey L Gellner
Attorney, Agent, or Firm—Merchant & Gould P.C.

[57] ABSTRACT

A self-watering tray includes a plate and a leg. The leg is filled with a material which provides a fluid conduit capable of draining water or fluid from a plant pot or box into the plate and of sucking water from the plate to the plant pot or box when needed. The plant pot or box can be a conventional plant pot or box. The top end of the leg is inserted into the plant pot or box. In addition, a self-watering pot-shaped apparatus is disclosed to allow fluid to be sucked or drained from one section of the apparatus to another section of the apparatus. Further, the tray or pot-shaped apparatus includes air vents on its side walls. Various arrangements and configurations of the tray and pot/tray are implemented in the self-watering pot-shaped apparatus.

19 Claims, 14 Drawing Sheets

U.S. PATENT DOCUMENTS

| | | |
|---|---|---|
| 320,588 | 6/1885 | Rhoads . |
| D. 352,480 | 11/1994 | Carlson . |
| D. 363,255 | 10/1995 | Helms et al. . |
| D. 384,907 | 10/1997 | Moskowitz . |
| D. 399,450 | 10/1998 | Durbin . |
| D. 399,451 | 10/1998 | Durbin . |
| D. 399,452 | 10/1998 | Durbin . |
| D. 399,453 | 10/1998 | Durbin . |
| D. 399,454 | 10/1998 | Durbin . |
| 1,216,642 | 2/1917 | White . |
| 1,247,766 | 11/1917 | White . |
| 1,778,150 | 10/1930 | Freeburg . |
| 2,072,185 | 3/1937 | Schein . |
| 3,027,684 | 4/1962 | Keiding . |
| 3,220,144 | 11/1965 | Green . |
| 3,866,351 | 2/1975 | Cobia . |
| 3,965,616 | 6/1976 | Ridgeway . |
| 4,059,920 | 11/1977 | Worrell . |
| 4,092,804 | 6/1978 | Morris et al. . |
| 4,224,764 | 9/1980 | Dziewulski et al. . |
| 4,231,187 | 11/1980 | Greenbaum ................................ 47/80 |
| 4,250,665 | 2/1981 | English et al. ............................. 47/81 |
| 4,299,055 | 11/1981 | Dziewulski et al. . |
| 4,324,070 | 4/1982 | Swisher ...................................... 47/81 |
| 4,339,891 | 7/1982 | Bassett ................................... 47/81 X |
| 4,344,251 | 8/1982 | Edling ........................................ 47/80 |
| 4,442,629 | 4/1984 | Anderson . |
| 4,553,352 | 11/1985 | Powell et al. .............................. 47/91 |
| 4,760,987 | 8/1988 | Lan . |
| 4,833,823 | 5/1989 | Edwards, III . |
| 4,880,156 | 11/1989 | Wallet . |
| 4,885,869 | 12/1989 | Kin ............................................. 47/79 |
| 4,885,870 | 12/1989 | Fong .......................................... 47/79 |
| 4,937,974 | 7/1990 | Costa, Jr. et al. ......................... 47/81 |
| 4,975,251 | 12/1990 | Saceman . |
| 5,209,013 | 5/1993 | Sellers . |
| 5,259,509 | 11/1993 | Boal, Jr. et al. . |
| 5,309,670 | 5/1994 | Bates . |
| 5,333,752 | 8/1994 | Harding, Jr. . |
| 5,341,596 | 8/1994 | Kao . |
| 5,429,236 | 7/1995 | Evans . |
| 5,564,226 | 10/1996 | Paramest . |
| 5,638,638 | 6/1997 | Moskowitz . |
| 5,797,217 | 8/1998 | Magee . |
| 5,806,241 | 9/1998 | Byland et al. . |
| 5,871,476 | 2/1999 | Hand . |

SELF-WATERING TRAY

RELATED PATENT APPLICATION

This patent application is a continuation-in-part patent application of U.S. patent application, Ser. No. 09/119,176, filed Jul. 20, 1998, subject matter of which is hereby incorporated by reference.

BACKGROUND OF THE INVENTION

I. Field of the Present Invention

The present invention relates to a tray, more particularly to a self-watering tray for holding a pot.

II. Description of the Prior Art

People usually use a tray to hold the water that is drained from a pot to avoid water spilling onto the floor. People also tend to over-water the plants to reduce the labor of frequently watering the plants. The problem is that the roots of the plant would become damaged if the tray is holding too much water.

The present inventor has also invented legged pots to avoid this similar problem. The present inventor has applied for patent applications on the legged pots: Ser. No. 08/990,195, filed Dec. 12, 1997, entitled "Legged Pot"; and Ser. No. 09/135,916, filed Aug. 18, 1998, subject of which are hereby incorporated. In these pending applications, a pot or a box includes one or more legs. Each leg has a conduit which is in fluid communication with the body of the pot or box. The legged pot can be placed in a tray or a water source. The soil, wick, or similar materials in the leg drains excessive water in the tray and sucks the water up to the pot or box when needed in the pot. Thus, the roots of the plant in the pot or box will not be damaged by excessive water. In the meantime, the plant still has sufficient water supply.

However, the present inventor has also found that some consumers want to use their existing conventional pots. The above-mentioned legged pots may not meet these consumer's demands. Also, another problem in a conventional pot/tray configuration is that the air vent between the pot and the tray is restricted. Lack of air may cause unhealthy growth of the plant.

Therefore, there is a need for a tray capable of holding a conventional pot while still avoiding root damages caused by excessive water. There is also a need for a tray capable of venting air. The present invention provides a solution to solve the above and other related problems.

SUMMARY OF THE INVENTION

The present invention relates to a tray, more particularly to a self-watering tray for holding a pot.

The present invention discloses a self-watering tray which allows water to be sucked from the tray to a pot or box which contains the plant. The present invention also discloses an apparatus which allows water to be sucked from one section of the apparatus to another section of the apparatus. Further, the present invention discloses a tray having a plurality of air vents which allow air venting between the pot and the tray.

In one embodiment of the present invention, a tray apparatus includes a plate having side walls and a bottom. The side walls and the bottom of the plate define an area for holding water. The tray apparatus also includes at least one leg. The leg couples to the bottom of the plate at a first end. The leg includes a fluid conduit between the first end and a second end for draining water into the tray and sucking water from the tray.

Other embodiments of the tray apparatus in accordance with the principles of the invention may include alternative or optional additional aspects. One such aspect of the present invention is that the leg is integrally coupled to the bottom of the plate. Alternatively, the leg is detachably coupled to the bottom of the plate. In such alternative embodiment, the tray apparatus further includes means for coupling the leg to the bottom of the plate. For example, a leg can be screwed onto the bottom of the plate by screwing means.

In one embodiment of the present invention, one end of the leg is inserted into holes disposed at the bottom of a conventional pot. The soil and plant in the pot hold the pot and the leg in position. Additional supports for supporting the pot can be provided. For example, the side walls of the plate can support the pot.

Still in one embodiment, the side walls of the plate may include at least one notch for air vent. The notch may be disposed at the top periphery of the side walls. Multiple notches may be provided to vent air between the pot and the tray.

Further in one embodiment, side walls of the plate may include a water intake mouth. Water can be added in the plate through the intake mouth.

In another embodiment of the present application, an apparatus includes a plate having side walls and a bottom. The side walls and the bottom of the plate define a first area for holding the water and a second area for holding the soil, plant, etc. The two areas are separated by a cover. The apparatus also includes at least one leg. The leg may couple to the bottom of the plate at a first end. The leg has a second end inserted into a hole on the cover. The leg is filled with a material which provides a fluid conduit between the first end and the second end for draining water from the second area to the first area and sucking water from the first area to the second area.

Other embodiments of the alternative apparatus in accordance with the principles of the invention may include alternative or optional additional aspects. One such aspect of the present invention is that the side walls of the plate have a water intake mouth such that water can be added in the first area of the plate.

Another aspect of the invention is that the leg is integrally coupled to the bottom of the plate. Alternatively, the leg is detachably coupled to the bottom of the plate. A further alternative embodiment is that the leg is configured to sit in the hole of the cover wherein the first end extends to the first area and the second end extends to the second area of the apparatus.

Still in one embodiment, the cover has holes for venting air such that air in the second area can be vented to outside via the first area and the water intake mouth on the side walls.

In another embodiment of the present invention, the bottom of the plate has a rail-like member, and the leg has a bottom piece insertable into the grooves of the rail-like member. Accordingly, the plate and the leg are detachably coupled to each other.

The present invention also discloses a pot/tray configuration. In one embodiment, the pot has a round shape, and the tray has a triangular shape. In an alternative embodiment, the pot has a round shape, and the tray has a rectangular shape. Water can be added via any of the triangles or rectangles of the tray. No additional water intake mouth is needed in such pot/tray configurations.

One advantage of the above inventions is that the roots of the plant in the pot will not be damaged by excessive water in a tray. Also, the plant is self watered through the leg when water is needed. The tray apparatus of the present invention can be used in conjunction with conventional pots or plant boxes.

These and various other advantages and features of novelty which characterize the invention are pointed out with particularity in the claims annexed hereto and forming a part hereof. However, for a better understanding of the invention, its advantages and objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

A better understanding of the construction and operational characteristics of a preferred embodiment(s) can be realized from a reading of the following detailed description, especially in light of the accompanying drawings in which like reference numerals in the several views generally refer to corresponding parts.

DETAILED DESCRIPTION OF THE PREFERRED EMBODIMENTS

The present invention relates to a tray, more particularly to a self-watering tray for holding a pot.

The present invention discloses a self-watering tray which allows water to be sucked from the tray to a pot or box which contains the plant. The present invention also discloses an apparatus which allows water to be sucked from one section of the apparatus to another section of the apparatus. Further, the present invention discloses a tray having a plurality of air vents which allow air venting between a pot and a tray.

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Figure 1:
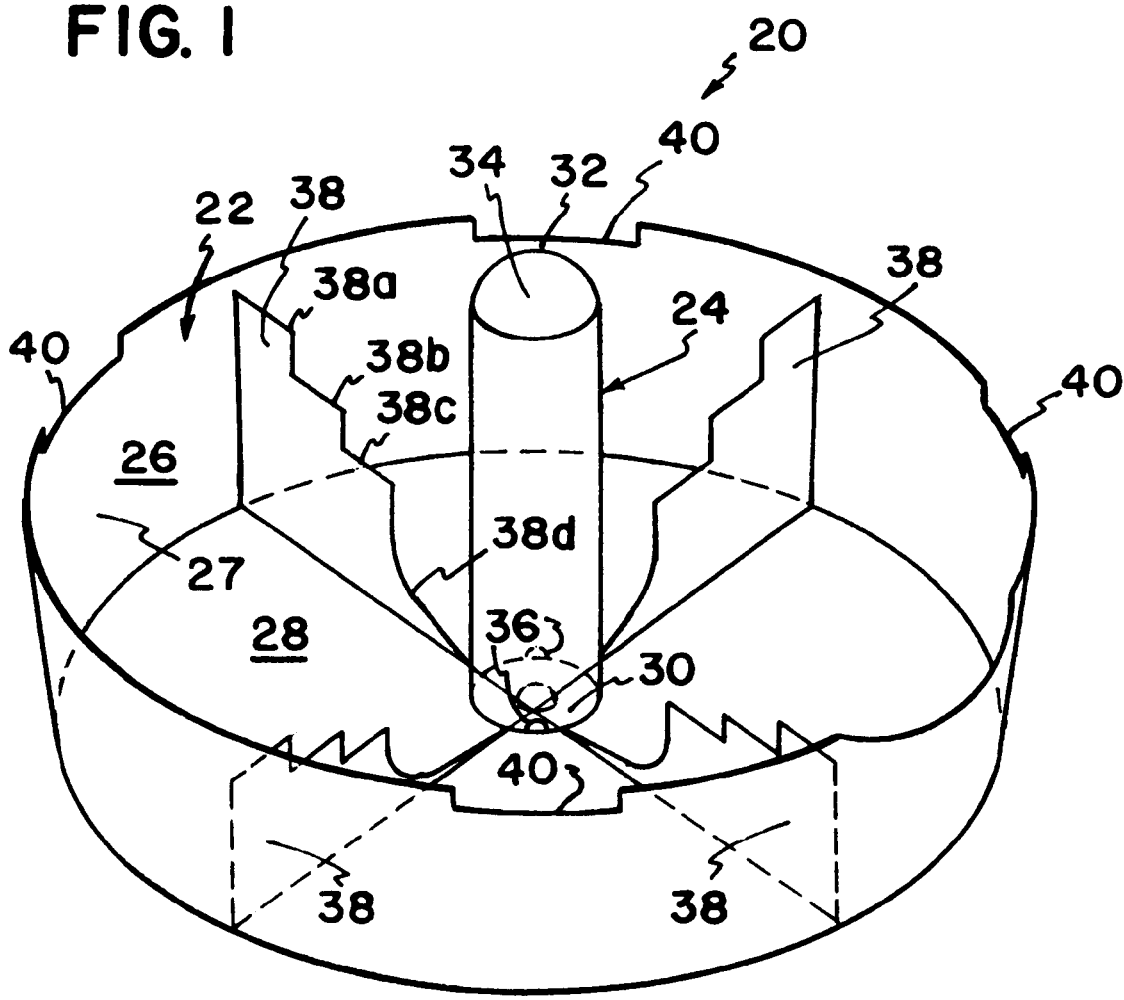
FIG. 1 is a perspective view of one embodiment of a tray apparatus in accordance with the principles of the present invention.
Figure 2:
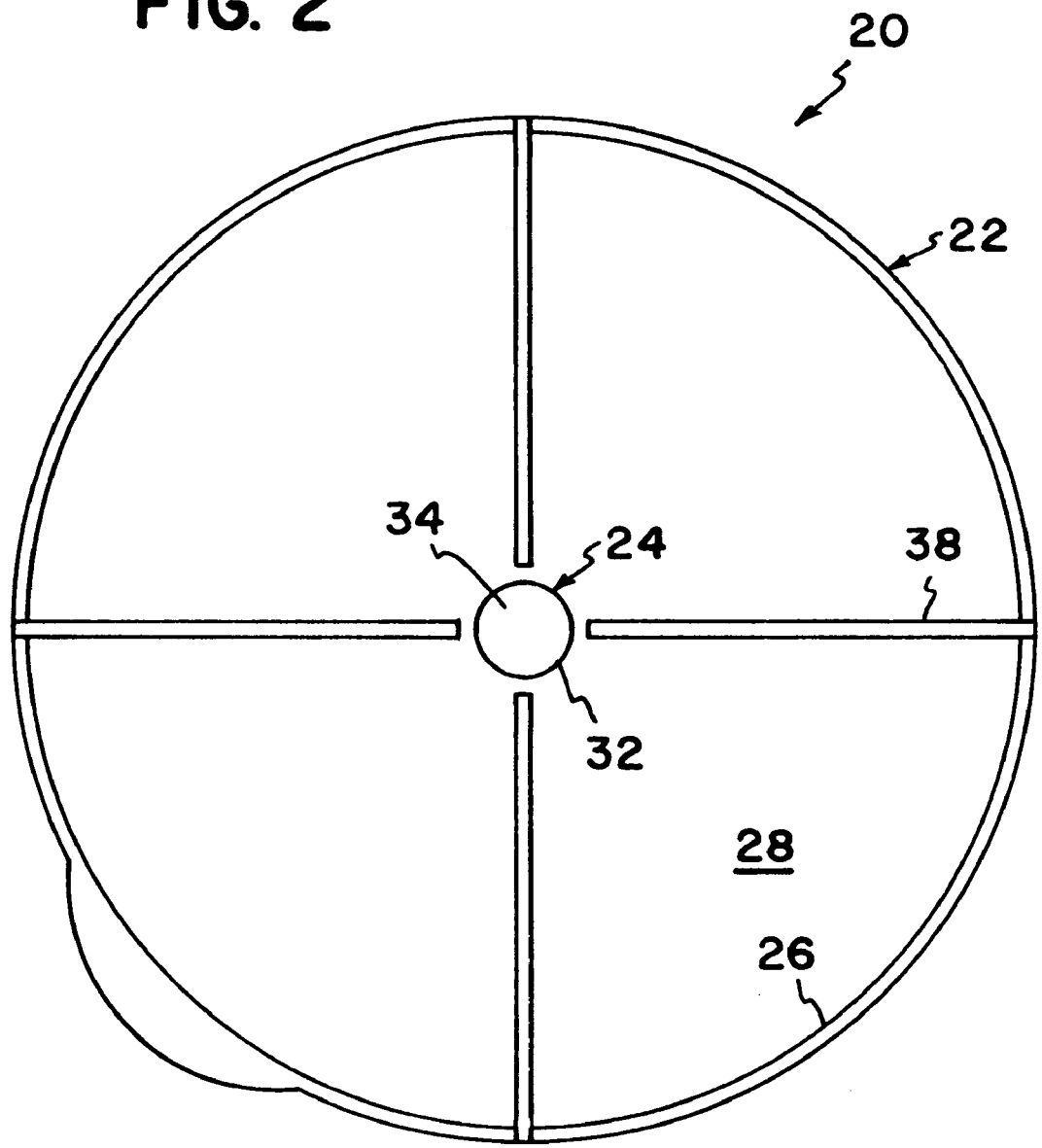
FIG. 2 is a top view of the tray apparatus shown in FIG. 1.

In FIGS. 1–2, there is, generally illustrated by reference numeral 20, a tray apparatus in accordance with the principles of the present invention. The tray apparatus 20 includes a plate 22 and a leg 24. The plate 22 has side walls 26 and a bottom 28. The side walls and the bottom define an area 27 for holding water. The leg 24 has a first end 30 coupled to the bottom 28 of the plate 22 and a second end 32. The leg 24 is in a tube shape and can be filled with materials such as soil, wick, etc. The filled leg has a fluid conduit 34 extending from the first end 30 to the second end 32. The conduit 34 drains the water into the plate 22 and sucks the water from the plate 22. The second end 32 of the leg 24 can be inserted into a hole at the bottom of a pot (see 97 in FIG. 10).

The leg 24 may be fixedly mounted onto the bottom 28 of the plate 22. Alternatively, the leg 24 may be detachably mounted, such as screwed, onto the bottom 28 of the plate 22. These and other similar mounting means are known in the mechanical art. The water in the conduit 34 exits at a hole (or holes) 36 at the first end 30. Similarly, the water in the plate enters from the plate into the conduit 34 at the hole 36.

A support (or supports) 38 may be used in the plate 22 to support a pot. The support 38 may include a series of steps 38a, 38b, 38c, 38d to support different sizes of the pots. The support 38 may be fixedly mounted onto the bottom 28 of the plate 22. Alternatively, the support 38 may be detachably mounted, such as screwed, onto the bottom 28 of the plate 22. These and other similar mounting means are known in the mechanical art. Additional supports, such as shoulders, may be added on the outer surface of the leg 24 to support the pot (as best seen in FIGS. 3–6C).

Also shown in FIG. 1, the side walls 26 may include a notch (or notches) 40 for venting air between the inside of the plate 22 and the outside of the plate 22. Thus, a pot having holes at its bottom is able to vent air.

Figure 3:
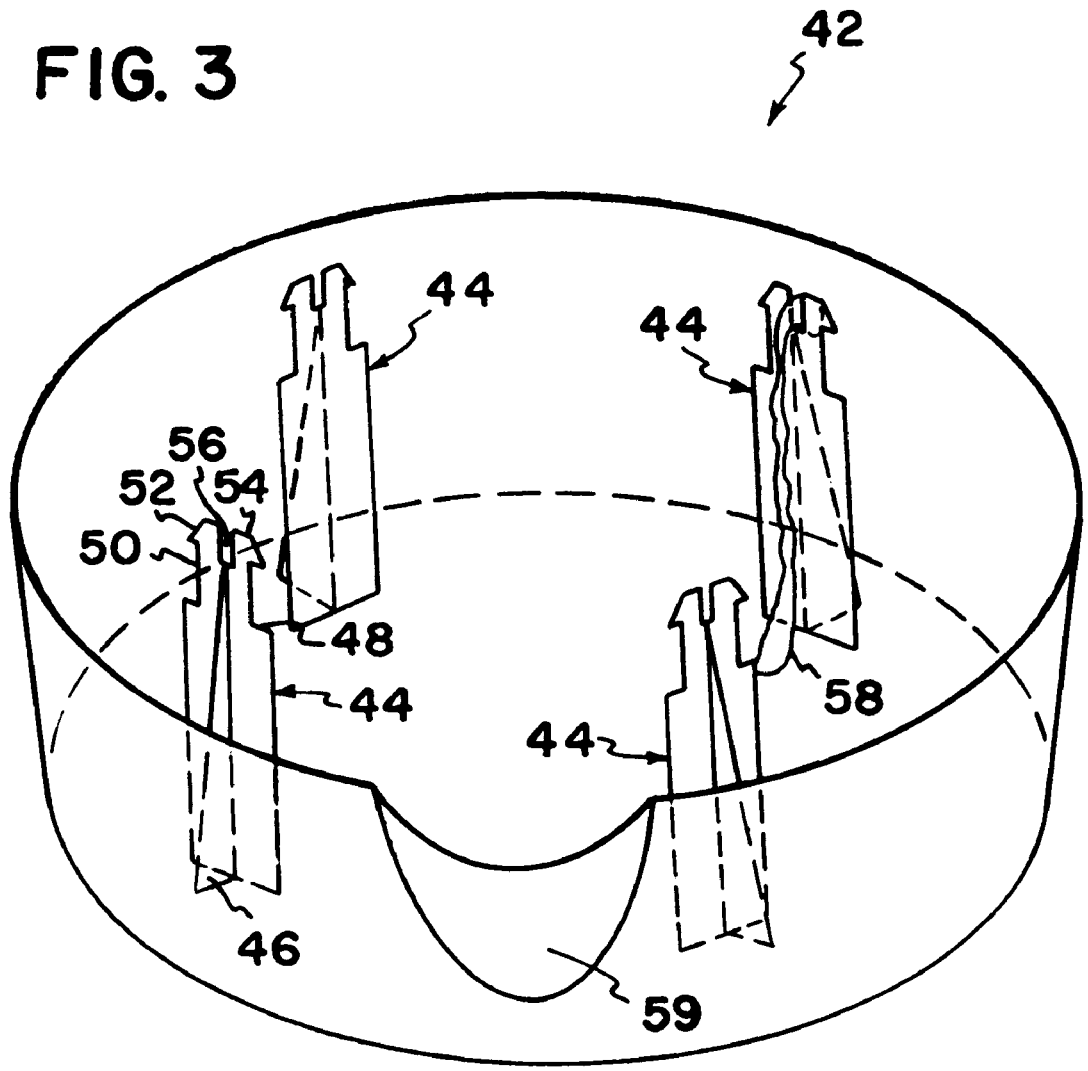
FIG. 3 is a perspective view of a second embodiment of a tray apparatus in accordance with the principles of the present invention.
Figure 4:
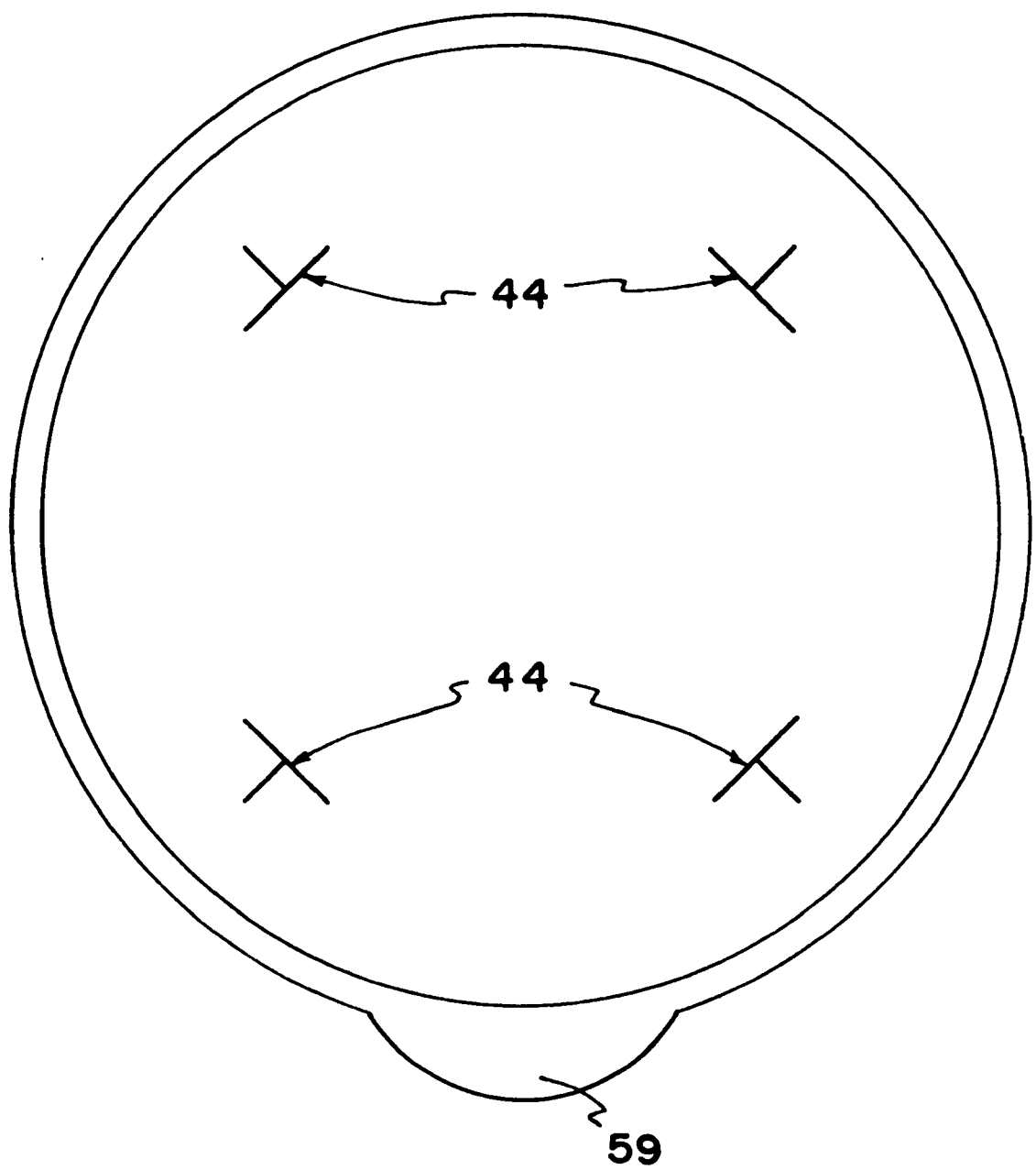
FIG. 4 is a top view of the tray apparatus shown in FIG. 3.

FIGS. 3–4 illustrate a second embodiment of a tray apparatus 42 in accordance with the principles of the present invention. In addition to the common features as shown in FIGS. 1–2, such as the side walls and the bottom, the tray apparatus 42 includes a plurality of members 44. Members 44 function the same as the leg 24 of FIG. 1. The bottom end of the member 44 is coupled to the bottom of the plate. For example, the member 44 is mounted onto the plate. Alternatively, the member 44 can simple stand in the plate. Each member 44 is self-supportive by its tail section 46. The top end is configured and arranged to be inserted in a bottom hole of a conventional pot (see 97 in FIG. 10). At the top end, the member 44 includes shoulders 48 to support the bottom of the pot, an upstanding section 50, and locking sections 52,54. The locking sections 52,54 lock into the material in the pot to provide additional stability between the tray apparatus and the pot. Between the locking sections 52,54 there is a notch 56. One end of a wick 58 is retained in the notch 56, and the other end of the wick 58 is laid in the plate. The wick 58 drains water from the pot to the plate when there is excessive water and sucks water from the plate to the pot when the water is needed. It is appreciated that a tube-like member filled with materials can be used to achieve the same function as the wick 58. Also shown in FIGS. 3–4, the tray apparatus may include a water intake mouth 59. Water can be added through the mouth 59. The water intake mouth 59 may also function as an air vent. It is appreciated that notches may be made on the side walls to provide additional air vent.

Figure 5A:
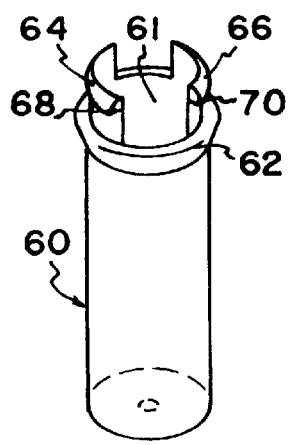
FIGS. 5A, 5B, 5C are perspective views of different embodiments of a leg used in the tray apparatus in accordance with the principles of the present invention.
Figure 5B:
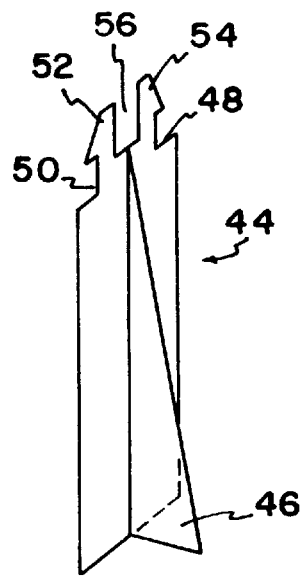
Figure 5C:
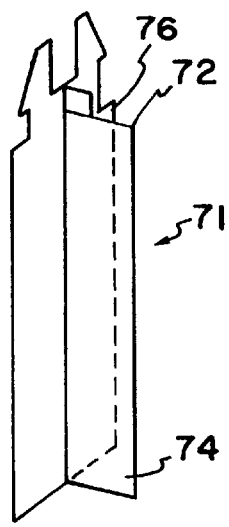
Figure 6A:
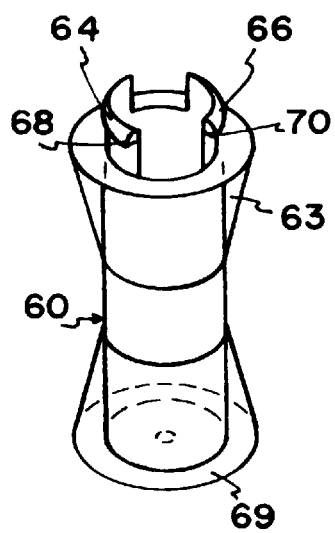
FIGS. 6A, 6B, 6C are perspective views of additional different embodiment of a leg in the tray apparatus in accordance with the principles of the present invention.
Figure 6B:
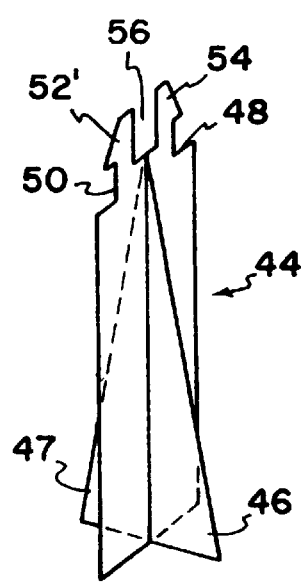
Figure 6C:
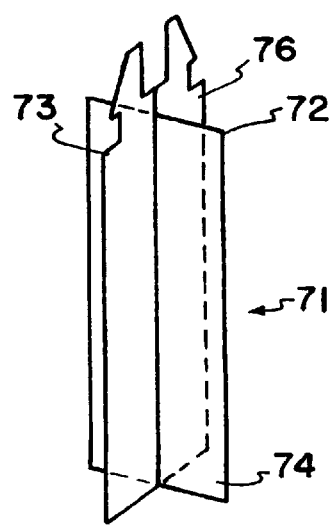

FIGS. 5A–5C and 6A–6C provide alternative embodiments of the member 44 shown in FIGS. 3–4 or the leg 24 shown in FIGS. 1–2. In FIG. 5A, the leg 60 is in a tube shape having a fluid conduit 61 therein. The leg 60 includes a shoulder 62 to support a pot. The locking sections 64,66 are inserted into the bottom hole of the pot. The tips 68,70 lock the material in the pot to provide additional stability. The leg 60 has holes at the side of the bottom end to allow water in and out of the leg. In FIG. 6A, an expanded shoulder 63 is used to support a large sized pot. Further, the leg 60 has an enlarged bottom end to provide additional support. FIG. 5B illustrates an enlarged view of the leg or member 44. In FIG. 6B, the leg is similar to that shown in FIG. 6A except that another tail section 47 is added to provide additional support. In FIG. 5C, a member 71 is similar to the member 44 except that a tail section 72 is different from the tail section 46 of the member 44. The tail section 72 has two rectangular members 74,76 to provide stability. In FIG. 6C, another tail section 73 is added to provide additional support. It is appreciated that other configurations of the leg or member can be used within the scope of the present invention.

Figure 7:
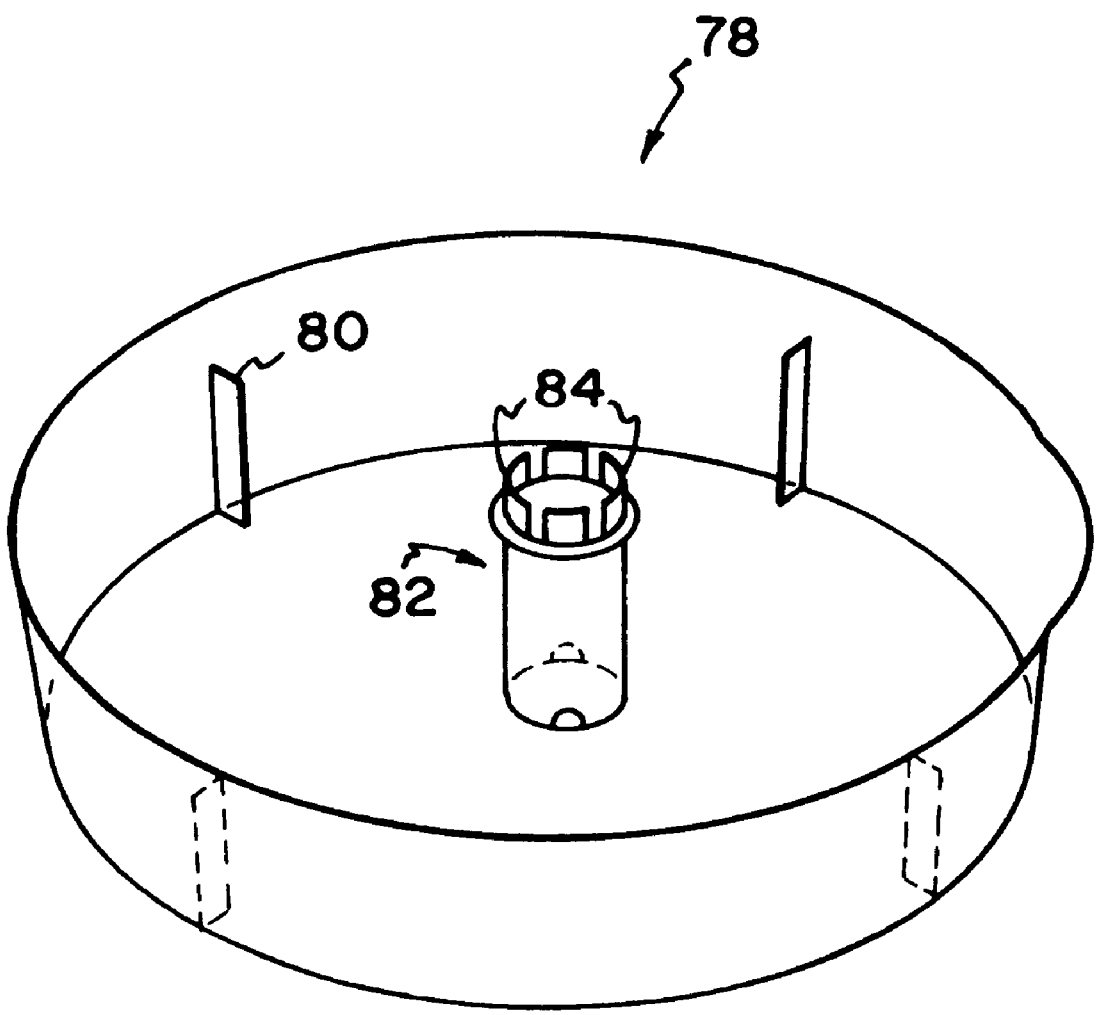
FIG. 7 is a perspective view of a third embodiment of a tray apparatus in accordance with the principles of the present invention.

FIG. 7 shows another alternative embodiment of a tray apparatus 78. A plurality of supports 80 are mounted on the side walls to support a large sized pot. A leg 82 is coupled to the bottom of the plate. The leg 82 is similar to the leg shown in FIG. 5 except that it has a plurality of lock sections 84. It is appreciated that more than one legs 82 can be provided in the plate to be inserted into the bottom holes of the large sized pot.

Figure 8:
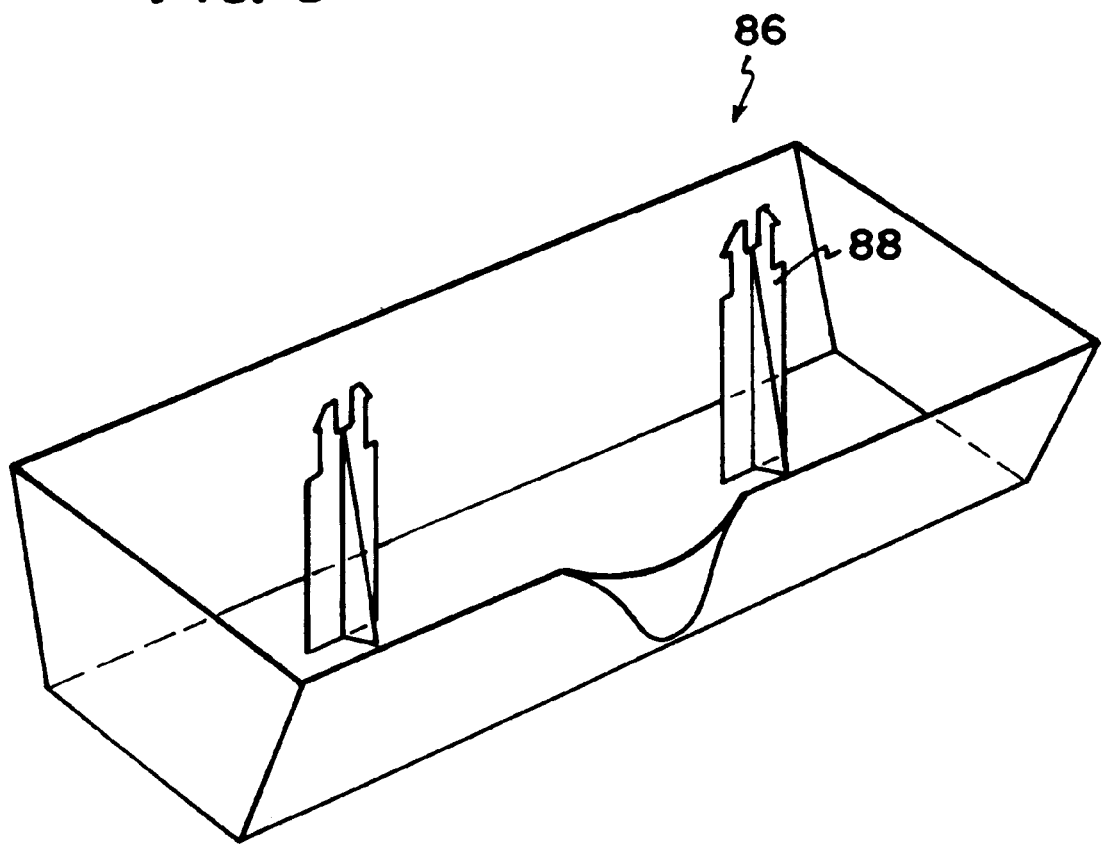
FIG. 8 is a perspective view of a fourth embodiment of a tray apparatus in accordance with the principles of the present invention.

FIG. 8 shows another alternative embodiment of a tray apparatus 86 to be used with a conventional plant box (not shown). A member (or members) 88 is provided to drain excessive water from the plant box as well as to suck water from the tray apparatus 86 to the plant box.

Figure 9:
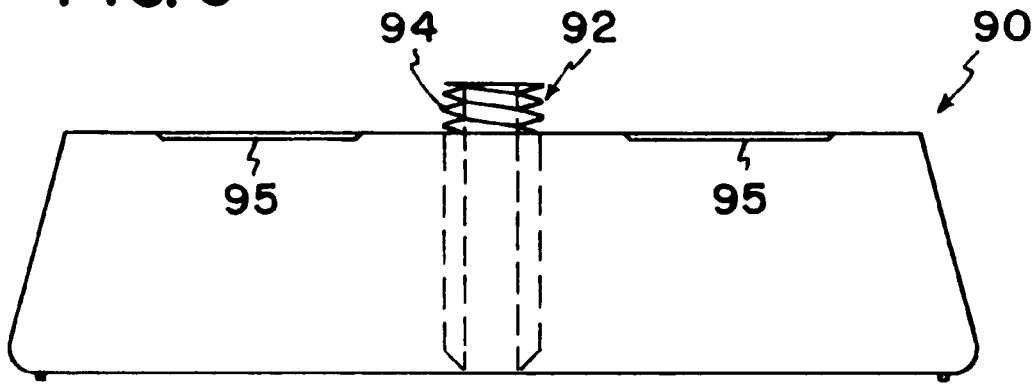
FIG. 9 is a front view of a fifth embodiment of a tray apparatus in accordance with the principles of the present invention.
Figure 10:
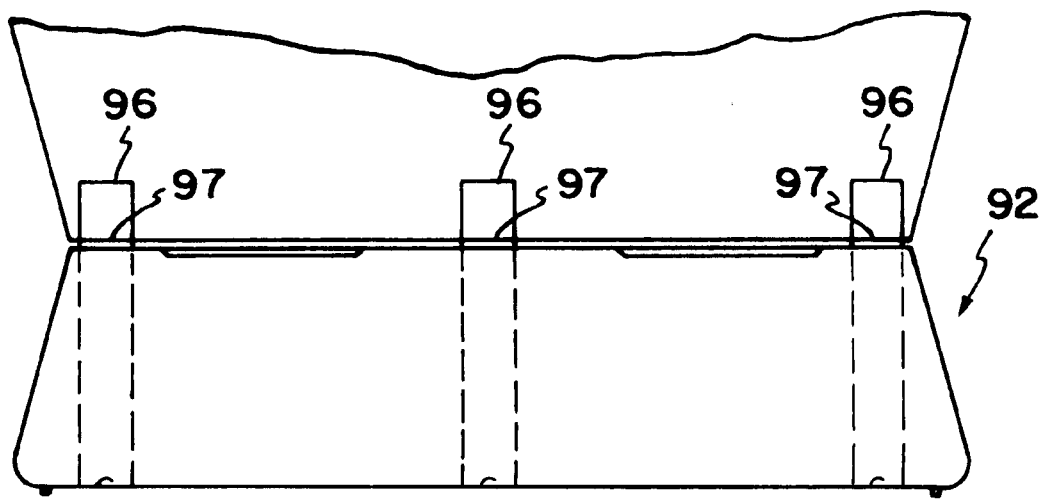
FIG. 10 is a front view of a sixth embodiment of a tray apparatus in accordance with the principles of the present invention.

FIGS. 9 and 10 illustrate alternative embodiments of the tray apparatus 90,92. In FIG. 9, the tray apparatus 90 includes a leg 92. The top of the leg 92 has screw grooves 94 to be screwed into the pot or the materials in the pot. The leg 92 is filled with a material which provides a fluid conduit to provide fluid communication between the pot and the tray 90. Notches 95 are provided for air vents. In FIG. 10, the tray apparatus 92 includes a plurality of legs 96 similar to the leg 24 in FIG. 1.

Figure 11:
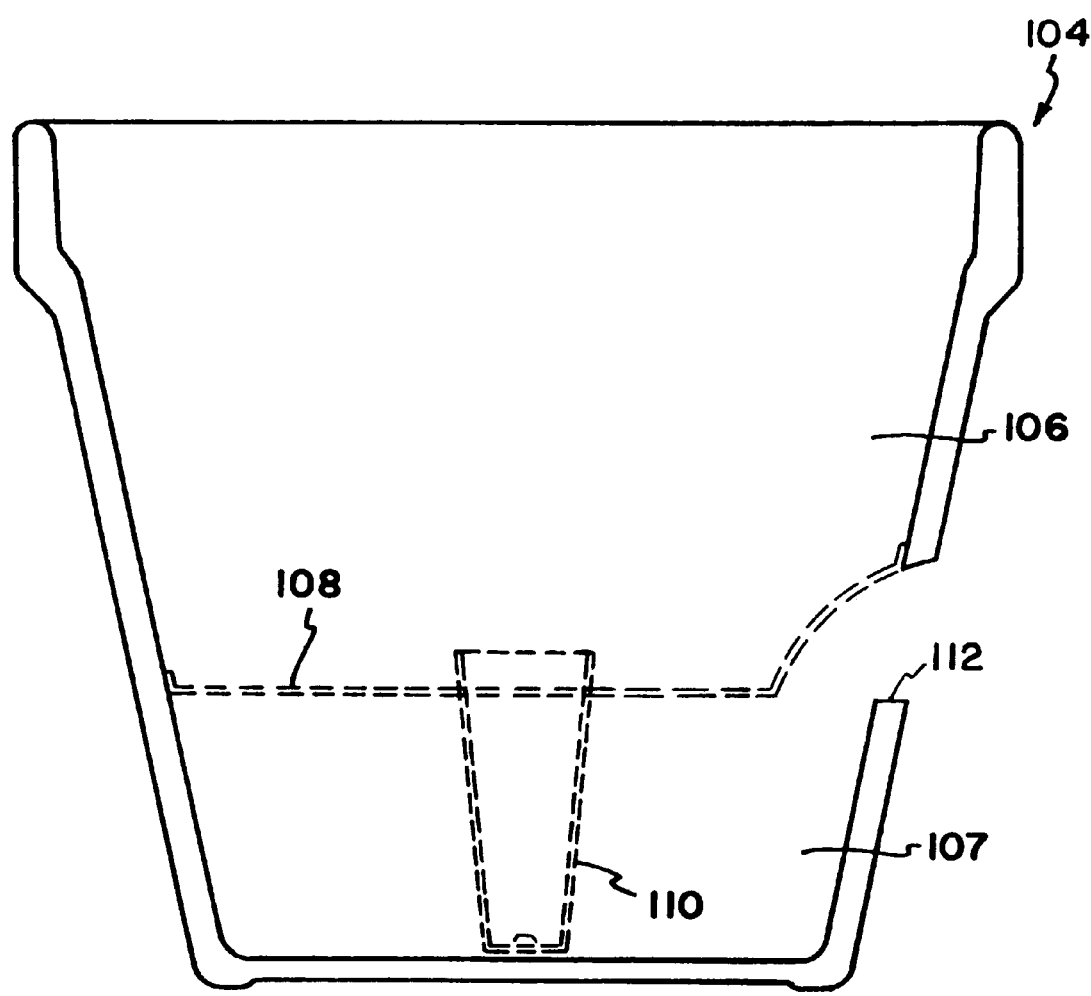
FIG. 11 is a front view of an apparatus in accordance with the principles of the present invention.
Figure 12:
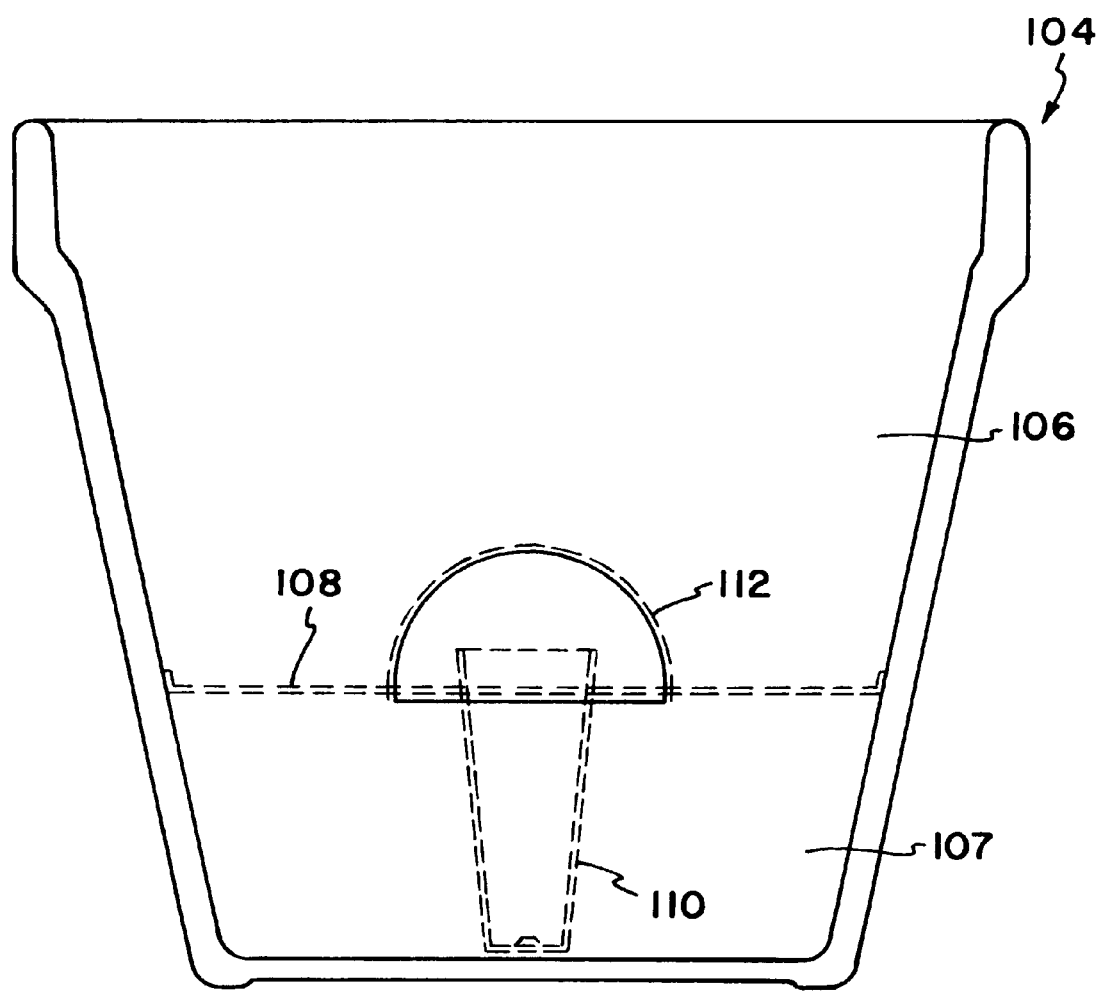
FIG. 12 is a side view of the apparatus shown in FIG. 11.

FIGS. 11–12 illustrates an alternative embodiment of the present invention. A pot-shaped apparatus 104 includes two areas 106,107 divided by a cover 108. The cover 108 is mounted on the side walls. The area 106 above the cover 108 holds the materials such as plant, soil, etc., and the area 107 beneath the cover 108 holds excessive water. A leg 110 is disposed in both areas 106,107 through a hole on the cover 108. The leg 110 is filled with a material which provides fluid communication between the first and second areas. A water intake notch 112 is provided on the side walls of the apparatus 104, whereby water can be added through the notch 112. Further, water may be emptied through the notch 112 without emptying the entire apparatus 104.

Figure 13A:
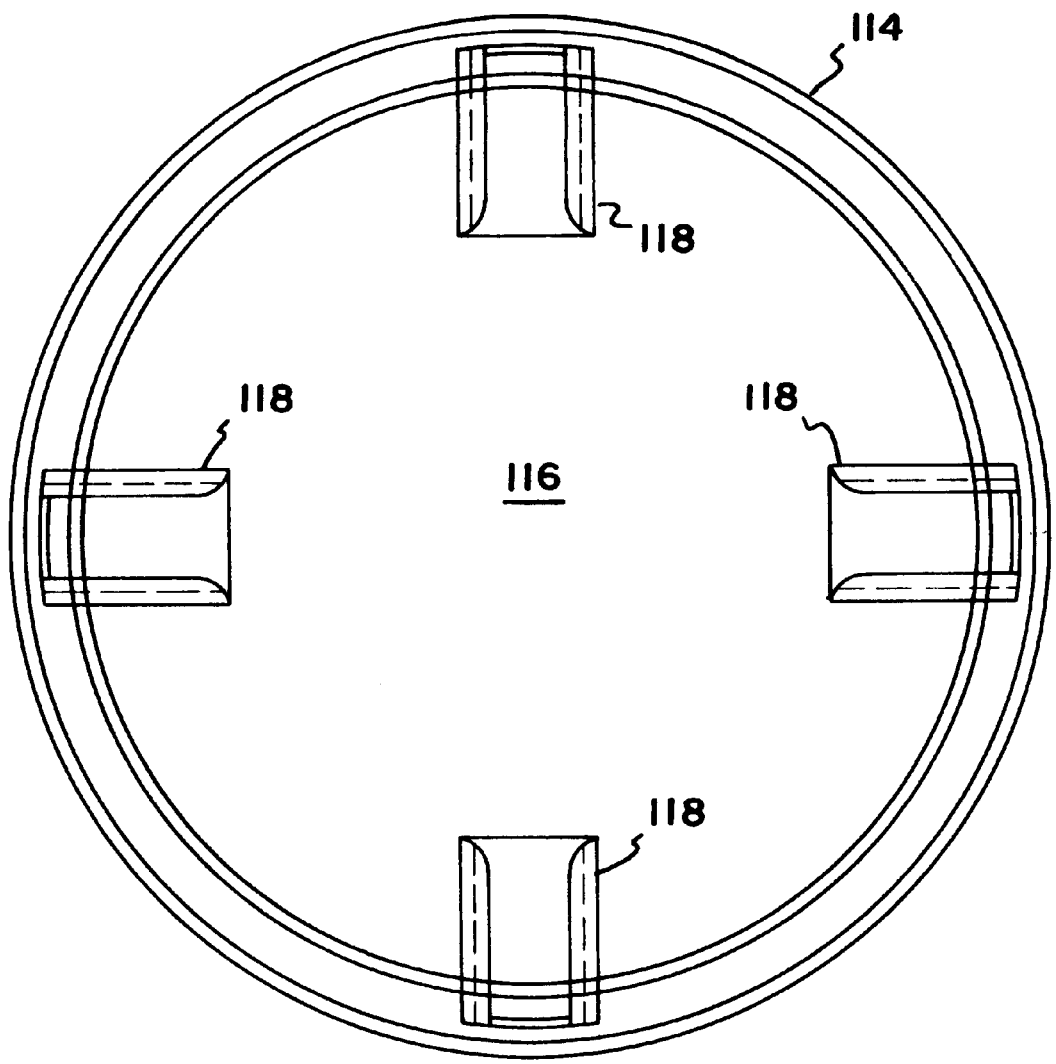
FIG. 13A is a top view of a seventh embodiment of a tray apparatus in accordance with the principles of the present invention.
Figure 13B:
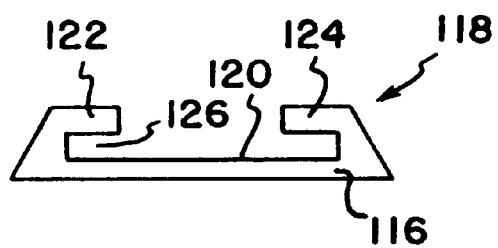
FIG. 13B is a view of a rail-like member of the tray apparatus along line I—I in FIG. 13A.

FIG. 13A illustrates another embodiment of a tray apparatus 114. A bottom 116 of the tray apparatus 114 includes one or more rail-like members 118. An enlarged view of the rail-like member 118 is shown in FIG. 13B. The rail member 118 maybe integral to the bottom 116 of the tray apparatus 114 at its bottom edge 120. Two shoulder pieces 122,124 may be bent horizontally which form a rail or sliding notch 126 therein.

Figure 14A:
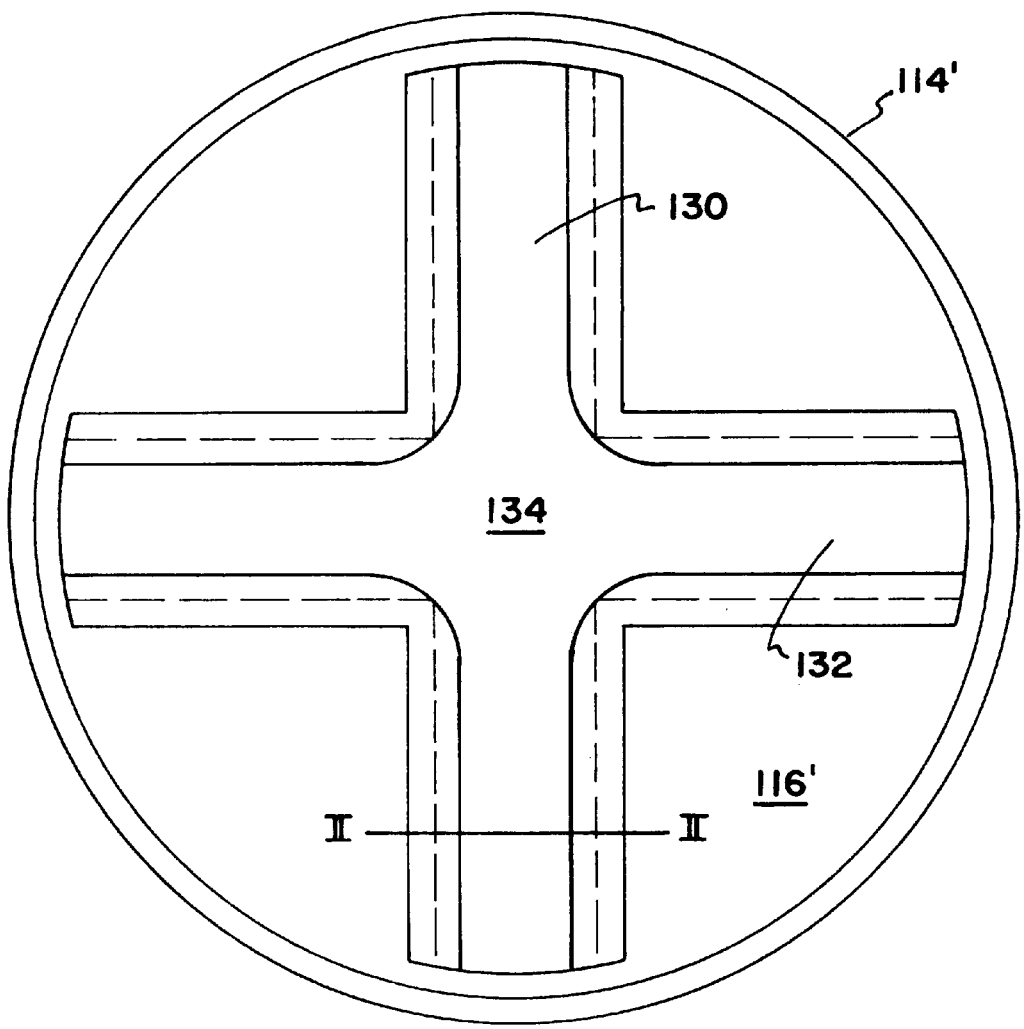
FIG. 14A is a top view of an eighth embodiment of a tray apparatus in accordance with the principles of the present invention.
Figure 14B:
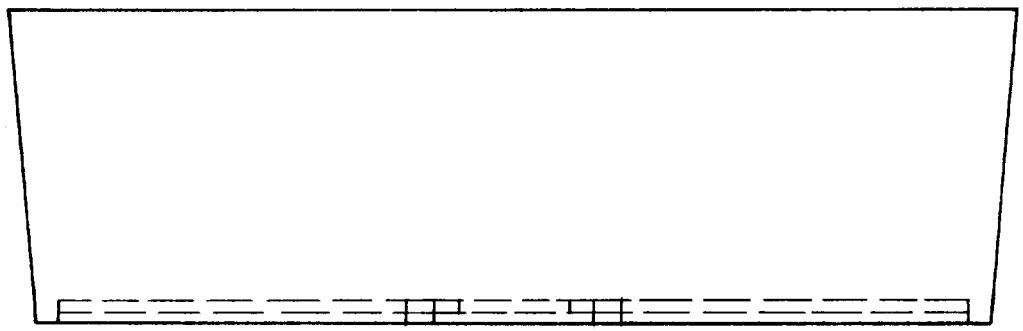
FIG. 14B is a side view of the eighth embodiment of the tray apparatus in FIG. 14A.
Figure 15B:
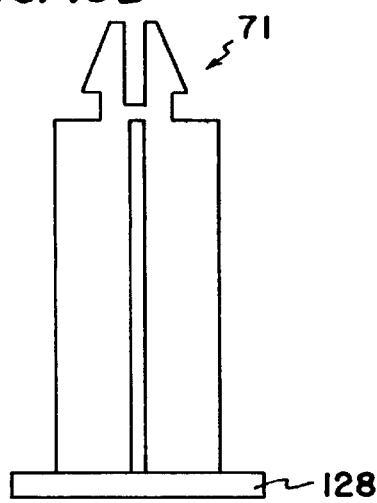
FIG. 15B is a side view of the adjustable leg of FIG. 15A.
Figure 15A:
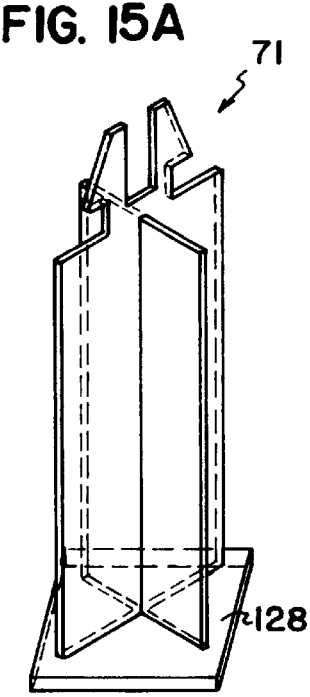
FIG. 15A is a perspective view of an adjustable leg in accordance with the principles of the present invention.
Figure 14C:
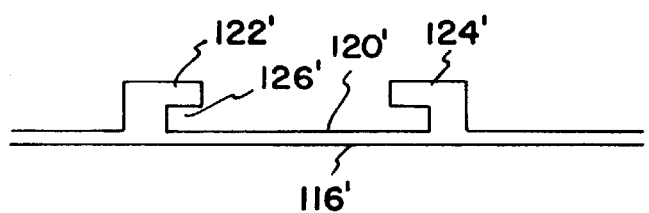
FIG. 14C is a view of a rail-like member of the tray apparatus along line II—II in FIG. 14A.
Figure 16:
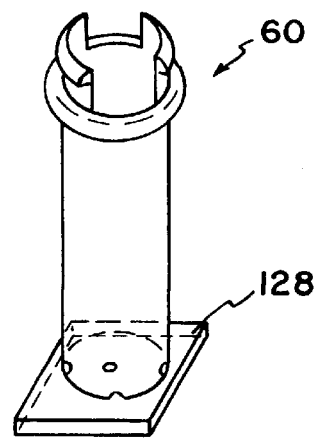
FIG. 16 is a perspective view of another embodiment of an adjustable leg in accordance with the principles of the present invention.

Legs 71 and 60, such as shown in FIGS. 15A–B and 16, may include a bottom piece 128 to be slidably inserted into the sliding notch 126 of the rail-like member 118. Accordingly, the legs 71 and 60 can be moved to different positions in the tray apparatus thereby fitting for a variety of pots which have different positions of the bottom holes. It is appreciated that the rail-like member 118 can be detachably coupled to the bottom of the tray apparatus. It is also appreciated that the positions of the rail-like member(s) 118 can be varied without departing from the principles of the present invention. Other alternative embodiments of the rail-like member(s) can be used within the scope of the present invention. For example, FIGS. 14A, B, C show a tray apparatus 114' having two perpendicularly positioned rails 130,132. A center formed by the two rails 130,132 has a larger opening area 134 than the width of the rails 130,132. Each of the bottom pieces 128 of the legs 71,60 may have a width larger than the top opening of the rails but smaller than the opening area 134. The bottom pieces 128 are inserted in the rails 130,132 via the larger opening area 134 and placed under two shoulders 122',124'. Accordingly, the legs can be slidably moved along a bottom edge 120' of a sliding notch 126' in the rails 130,132. It is appreciated that one or more than two rails can be integral to the bottom of the tray apparatus. It is also appreciated that the rail(s) can be a separate piece which is placed on the bottom of the tray apparatus.

Figure 17:
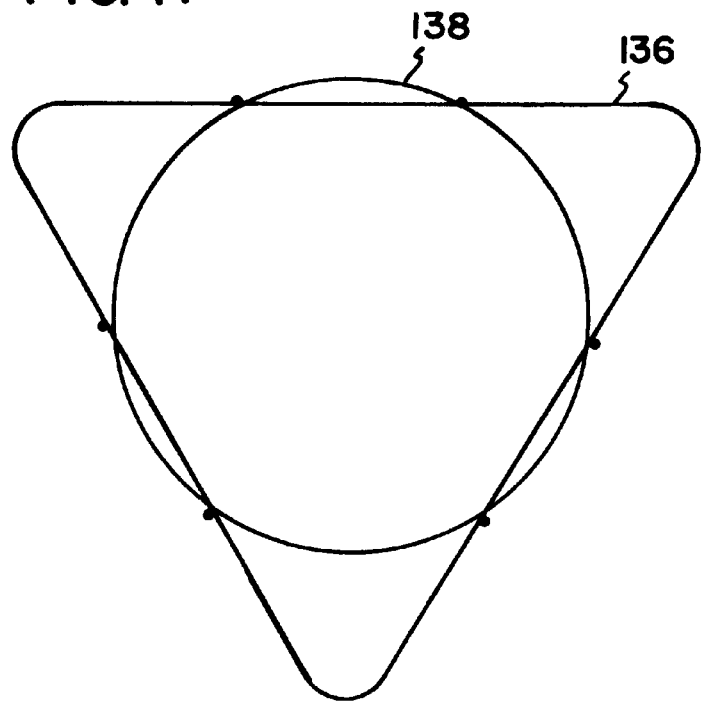
FIG. 17 is a top view of a pot/tray apparatus in accordance with the principles of the present invention.
Figure 18:
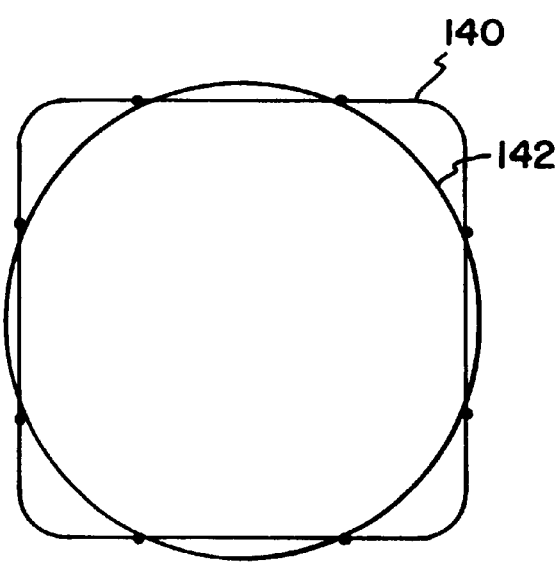
FIG. 18 is a top view of another pot/tray apparatus in accordance with the principles of the present invention.

FIGS. 17 and 18 are a top view of two pot/tray configurations. FIG. 17 shows that a tray 136 has a triangular shape, and a pot 138 has a round shape, such that the pot 138 can be readily supported by the tray 136. Water can be added in the tray 136 at any of three triangles. FIG. 18 shows that a tray 140 has a rectangular shape, and a pot 142 has a round shape, such that the pot 142 can be readily supported by the tray 140. Water can be added in the tray 136 at any of four rectangles.

The tray apparatus(es), including the plate, the leg, etc., can be made of plastic, ceramic, or clay, etc. Other materials can be used within the scope of the present invention.

It is noted that water is used as an example of a type of fluid in the above embodiments. It is appreciated that other fluids, such as a mixture of water and fertilizer, etc., can be used within the scope of the present invention.

It is also noted that the wick or soil is used as an example of a type of material filled in the leg or tube in the above embodiments. It is appreciated that other materials can be used within the scope of the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A self-watering tray for a plant pot, comprising:
   a plate, the plate holding fluid;
   at least one leg coupled to the plate, the at least one leg filled with a material which provides a fluid conduit capable of draining fluid into the plate and sucking fluid from the plate; and
   a support having at least two contiguous steps capable of supporting different sized pots.

2. The tray of claim 1, wherein the plate has side walls and a bottom, the side walls and the bottom of the plate define an area for holding fluid.

3. The tray of claim 2, wherein the side walls include a notch being positioned at a top of the side walls of the plate for air venting inside and outside of the plate.

4. The tray of claim 2, wherein the side walls include a fluid intake mouth, additional fluid can be added into the plate through the fluid intake mouth.

5. The tray of claim 2, wherein the leg is integrally mounted on the bottom of the plate.

6. The tray of claim 2, wherein the leg is detachably mounted on the bottom of the plate.

7. The tray of claim 1, wherein the fluid absorbing material is a wick.

8. The tray of claim 1, wherein the fluid absorbing material is soil.

9. The tray of claim 1, wherein the leg is a self-supporting member having a tail section, the tail section supports the member to stand in the plate.

10. The tray of claim 9, wherein the self-supporting member includes a hook section capable of coupling the member to the pot.

11. The tray of claim 1, wherein the leg includes a top end having screw grooves for mounting the tray to the pot.

12. The tray of claim 1, wherein the plate having a box shape.

13. The tray of claim 1, wherein the plate includes a first area for holding fluid and a second area for holding the fluid absorbing material, the at least one leg extending between the first area and the second area.

14. The tray of claim 13, wherein the first and second areas are separated by a cover.

15. The tray of claim 14, wherein the plate has side walls and a bottom, the side walls beneath the cover and the bottom define the first area, the side walls above the cover define the second area.

16. The tray of claim 15, wherein the side walls beneath the cover include a fluid intake mouth, additional fluid can be added into the first area through the fluid intake mouth.

17. The tray of claim 2, wherein the plate has at least one rail-like member integral to the bottom of the plate, the leg has a bottom piece insertable into the rail-like member so as to allow coupling between the plate and the leg.

18. The tray of claim 1, wherein the plate has a triangular shape, and the plant pot has a round shape.

19. The tray of claim 1, wherein the plate has a rectangular shape, and the plant pot has a round shape.

* * * * *